(12) United States Patent
Ruch (10) Patent No.: US 7,783,112 B2
(45) Date of Patent: Aug. 24, 2010

(54) METHOD FOR MEASURING THE PROXIMITY OF TWO CONTOURS AND SYSTEM FOR AUTOMATIC IDENTIFICATION OF TARGETS

(75) Inventor: Olivier Ruch, Versailles (FR)

(73) Assignee: Thales (FR)

( * ) Notice: Subject to any disclaimer, the term of this patent is extended or adjusted under 35 U.S.C. 154(b) by 924 days.

(21) Appl. No.: 10/564,762

(22) PCT Filed: Jul. 13, 2004

(86) PCT No.: PCT/EP2004/051476

§ 371 (c)(1),
(2), (4) Date: Jan. 17, 2006

(87) PCT Pub. No.: WO2005/017818

PCT Pub. Date: Feb. 24, 2005

(65) Prior Publication Data

US 2006/0193493 A1    Aug. 31, 2006

(30) Foreign Application Priority Data

Jul. 17, 2003   (FR)   .................................. 03 08707

(51) Int. Cl.
*G06K 9/48* (2006.01)
(52) U.S. Cl. .................. 382/199; 382/203; 382/204; 382/206; 382/209
(58) Field of Classification Search ............... 382/199, 382/203, 204, 206, 209
See application file for complete search history.

(56) References Cited

U.S. PATENT DOCUMENTS

| | | | | |
|---|---|---|---|---|
| 6,249,604 | B1* | 6/2001 | Huttenlocher et al. | 382/174 |
| 2004/0037467 | A1* | 2/2004 | Wenzel et al. | 382/203 |

OTHER PUBLICATIONS

Dubuisson M-P et al: "A modified Hausdorff distance for object matching" Pattern Recognition, 1994. vol. 1-Conference A: Computer Vision & Image Processing., Proceedings of the 12$^{th}$ IAPR International Conference in Jerusalem, Israel Oct. 9-13, 1994, Los Alamitos, CA, USA, IEEE, Comput. Soc, Oct. 9, 1994, pp. 566-568.

(Continued)

*Primary Examiner*—Matthew C Bella
*Assistant Examiner*—Mike Rahmjoo
(74) *Attorney, Agent, or Firm*—Lowe Hauptman Ham & Berner, LLP (57) ABSTRACT

A method of measurement of proximity of a second contour to a first contour, comprises for each point of the first contour, a step of association with a point of the second contour determined as the closest, and a step of pairing each point of the second contour with one or zero points of the first contour, by determining the point of the first contour which is closest from among the set of points of the first contour that are associated with said point of the second contour.

A method of automatic identification of targets applies this proximity measurement process to determine the measure of proximity of a template contour, applied as second contour, to an image contour, applied as first contour.

13 Claims, 4 Drawing Sheets

OTHER PUBLICATIONS

Toet A et al: "Genetic contour matching" Pattern Recognition Letter, North-Holland Publ. Amsterdam NL Aug. 1, 1995 pp. 849-856.

Huttenlocher D P et al : "Comparing images using the Hausdorff distance under translation" Proceeding of the Computer Society Conference on Computer Vision and Pattern Recognition Champaign, IL, Jun. 15-18, 1992 New York, IEEE, US Jun. 15, 1992 pp. 654-656.

Gupta L et al : "Robust automatic target recognition using a localized boundary representation" Pattern Recognition, Pergamon Press Inc., Elmsford, NY US Oct. 1, 1995 pp. 1587-1598.

Dubuisson, M-P et al. "A Modified Hausdorff Distance for Object Matching", Pattern Recognition, 1994, vol. 1, Conference A: Computer Vision & Image Processing., Proceedings of the 12th IAPR International Conference on Jerusalem, Israel Oct. 9-13, 1994, Los Alamitos, CA, USA, IEEE Comput. Soc. Oct. 9, 1994, pp. 566-568, XP010216070, ISBN: 0-8186-6265-4.

Toet, A. et al. "Genetic Contour Matching", Pattern Recognition Letters, North-Holland Publ. Amsterdam, NL, Vo. 16, No. 8 Aug. 1, 1995, pp. 849-856, XP004062328, ISSN: 0167-8655.

Huttenlocher, D. P. et al. "Comparing Images Using the Hausdorff Distance Under Translation", Proceedings of the Computer Society Conference on Computer Vision and Pattern Recognition, Champaign, IL, June 15-18, 1992, New York, IEEE, US, Jun. 15, 1992, pp. 654-656, XP010029292, ISBN: 0-8186-2855-3.

Gupta, L. et al. "Robust Automatic Target Recognition Using a Localized Boundary Representation", Pattern Recognition, Pergamon Press Inc. Elmsford, NY, US, vol. 28, No. 10, Oct. 1, 1995, pp. 1587-1598, XP004002554, ISSN: 0031-3203.

* cited by examiner

METHOD FOR MEASURING THE PROXIMITY OF TWO CONTOURS AND SYSTEM FOR AUTOMATIC IDENTIFICATION OF TARGETS

FIELD OF THE INVENTION

The present invention relates to the automatic identification of targets present in an image. More precisely this invention describes a discriminating procedure making it possible to compare 2D contours. It applies mainly in the military field, in order to assist the pilot of an aircraft in a combat situation in his choices of firing. It is also of interest in any other field relating to shape recognition, in particular, the field of surveillance and the medical field.

An automatic identification process must make it possible to reliably determine how many targets there are in the image, what positions they are at and what types they are.

By target is understood a 3D object that one seeks to identify. In the military field, these targets are typically tanks, terrestrial vehicles, etc. In what follows, we shall speak either of targets or of objects.

In the present patent application, identification system is understood to mean a system through which a target in an image is identified by its type: make, name or number, or else by its class: car, tank, coach, etc.

The automatic identification of objects or targets is a complex algorithmic problem on account on the one hand of potential resemblances between two different targets from certain angles of view, and on the other hand of the large variability of appearance of a target, due to geometrical deformations, to the position of certain elements, or to the presence of certain equipment. For example, a vehicle may have open or closed doors, baggage on the roof, etc.

One seeks to automatically identify, in the most reliable manner possible, targets in an image. The automatic identification process must thus exhibit two essential qualities: be robust, that is to say hardly sensitive to variations of appearance of a target which give rise to local perturbations on the object in the image; be discriminating, that is to say be capable of discerning between two targets that are close in appearance.

DESCRIPTION OF THE PRIOR ART

In the invention, one is more particularly interested in an automatic system for identifying targets that is based on comparing contours. In such a system, firstly, the contours present in the image to be analyzed are extracted and then, secondly, these contours are compared with those of a reference base of targets, containing data representing the 3D objects that one seeks to identify.

The extraction of the contours present in the image is done with the aid of a technique referred to as segmentation. The result is a so-called extracted contours image, corresponding to a binary image depicting nothing other than pixels of contours, represented in general by white points on a black background. In this image, only the pixels of contours contain information. In what follows, unless explicitly mentioned to the contrary, a point is to be understood to mean a point carrying information, that is to say a point belonging to a contour in the template or in the image. The pixels which are not contour points are not information carriers.

The image of extracted contours is then compared with the contours obtained from a database representing the 3D objects that one seeks to identify. These contours are said to be template-contours and are obtained, for each of the 3D objects, by projection according to a set of viewpoints making it possible to represent all the appearances of the object. To each 3D object in the base there thus corresponds a collection of template-contours of this object.

In the invention, one is more particularly interested in a so-called correlative comparison procedure, which consists in comparing each template contour with the image of extracted contours for all the possible positions of this template contour in the image. For a given position, this comparison is performed by superimposing the template contour on the image, and consists in measuring the "discrepancy" between the points of the template contour and those of the image of extracted contours. Each of the template-contours being tagged with respect to an origin, it is possible to recalculate the coordinates of each of its points in the coordinate system of the image of contours, according to the image pixel on which this origin is centered. Each of the template-contours is thus scanned over the whole of the image of extracted contours.

When the image of extracted contours has been scanned by the whole set of template-contours, the process consists in selecting the most likely hypothesis or hypotheses.

Hypothesis is understood to mean a target, a position of this target in the image and a viewpoint from which this target is observed.

A procedure for evaluating the discrepancy between the points of template contours and the points of extracted contours consists in counting up the number of points that these contours have in common.

This simple evaluation procedure based on the number of points in common with a template contour is however not very robust and not very discriminating. It is not very robust since it is highly sensitive to the variations in appearance of the target and not very discriminating since it takes all the points of the contour into account with the same importance.

Another more complex evaluation procedure uses a so-called Hausdorff measure method. This method consists in identifying for each of the points of a template contour, the smallest distance from this point to the points of the image contour, and in deducing therefrom a degree of dissimilarity between the template contour and the image contour, on the basis of the mean of the distances evaluated.

However, this method although it is more competitive than the previous one is not sufficiently robust or discriminating, since it may take account of irrelevant distances which ought to be discarded. Specifically, one and the same point of a template contour may be viewed as closest to several different points of the image contour. This is the case in particular if the image contains spurious points which do not correspond to a contour of a target to be identified, for example, points which correspond to internal contours of the target, or points which correspond to the environment of the target (vegetation, buildings, etc). These spurious points will perturb the measurement. Taking all these distances into account may thus lead to a false hypothesis.

SUMMARY OF THE INVENTION

A subject of the invention is an automatic identification process which does not exhibit these various drawbacks.

An automatic identification process according to the invention comprises a method of measurement of proximity of a template contour to an image contour based on a step of one-to-one pairing of each point of a template contour to zero or one points of the image contour.

This method of pointwise pairing comprises a step of associating, with each point of the image contour, of the point of the template contour that is closest. In this step, two items of information are matched up with each point of the image contour: the coordinates of a point of the template contour determined as being the closest and the distance between the two points thus associated.

Then, inversely, for each point of the template contour, the whole set of points of the image contour which have been associated with it in the previous step is considered and in this set, the point of the image contour that is closest is determined by taking the smallest distance. A pointwise one-to-one pairing is obtained. On output, each point of the template contour is paired either with zero points of the image contour or with one point of the image contour corresponding to the smallest distance.

By allocating a local score of proximity to each point of the template contour, equal to zero if it is paired to zero points of the image contour, and if it is paired to one point of the image contour, equal to a value that is all the smaller the larger the distance between the two paired points, it is possible to calculate a global score, equal to the mean of the local scores which expresses the probability of similarity of the template contour to the image contour.

The global score which results from this procedure is much more discriminating than the proximity measure used in the methods of automatic identification of the prior art, in particular in relation to false hypotheses.

An automatic identification system according to the invention uses this method for each position of the template contour in the image, and for each template of a collection of templates.

The set of global scores obtained, corresponding to the various template contours and to their various positions in the image, makes it possible to devise a certain number of hypotheses, adopting the best global scores of proximity.

The pointwise pairing process according to the invention makes it possible to improve the discrimination of the automatic identification system in relation to false hypotheses corresponding to cases where the contours in the image comprise interior points of contours, that is to say corresponding to internal contours of a target, and exterior points of contours, that is to say corresponding to the environment of the target (vegetation, buildings, etc).

According to another aspect of the invention, to improve the discrimination between hypotheses of targets which are superimposed (that is to say at positions that are identical or close in the image, this customarily being defined by contour points in common between the two hypotheses of template contours), the method of proximity measurement applies a local weighting at each point of a template contour. This weighting is representative of an amount of information contained at this point and defined with respect to the other template contour. This weighting makes it possible to discriminate the silhouettes of the two targets on the basis of their local differences. More particularly, this weighting consists in applying the method of measurement of proximity between the two template contours to be discriminated, so as to obtain, for each template contour, a weighting factor at each point which makes it possible to give more weight to the points of the template contour which contain the information regarding differences with the other template contour. When the collection of hypotheses contains more than two superimposable hypotheses, this weighting process is applied pairwise, and the best global score obtained each time is adopted.

The automatic identification system according to the invention applies to each of the template contours of a collection, the process of measurement of proximity of this template contour to the image contour to be analyzed so as to evaluate the likelihood of this template and between the template contours taken in pairs into a selection of hypotheses which are superimposed, so as to discriminate between two template contours that are close by locally weighting this probability relative to each of the two templates.

Thus, the invention relates to a method of measurement of proximity of a second contour to a first contour, comprising for each point of the first contour, a step of association with a point of the second contour determined as the closest, it comprises a step of pairing each point of the second contour with one or zero points of the first contour, by determining the point of the first contour which is closest from among the set of points of the first contour that are associated with said point of the second contour.

The invention also relates to a method of automatic identification of targets, which uses such a method of measurement of proximity of a template contour to an image contour.

According to an improvement, this method of identification uses this method of measurement of proximity of a template contour to another template contour, to allow discrimination between two hypotheses which are superimposed.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention.

Accordingly, the drawings and description thereof are to be regarded as illustrative in nature, and not as restrictive.

DETAILED DESCRIPTION OF THE INVENTION

Figure 1:
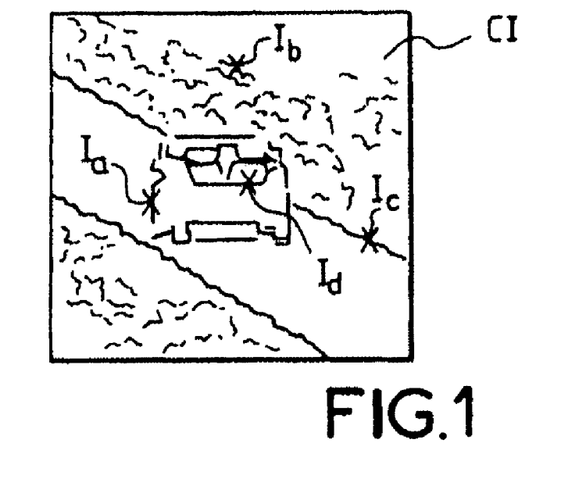
FIG. 1 represents an image of contours that is extracted from an input image applied to a system for the automatic identification of contours.

FIG. 1 represents an image of contours that are extracted from a data image, which can emanates from an infrared camera, from a video system, or from any other source of images.

We wish to determine in this image of extracted contours how many targets it contains, at what positions and of what types, from among a set of identified targets, which we have in the form of 3D objects in a database. To do this, we construct a set of 2D template contours corresponding to projections of each of the 3D objects, according to various angles of view, taking account of the information on the conditions under which the targets are observed, such as for example, information regarding the distance between the target and the sensor, view angles, etc.

Let us consider a template contour, denoted CM, positioned in any manner in the image of extracted contours. In what follows, the set of points of contours of the image of extracted contours is called the image contour CI. We apply a method of measurement of proximity according to the invention to measure the proximity of this contour CM to the image contour to be analyzed.

FIG. 1 illustrates an image of contours extracted from an image obtained in any manner: infrared image, active image. It contains points of the image contour which correspond to the black pixels on this image, such as the points referenced $I_a$, $I_b$, $I_c$, $I_d$ in FIG. 1. These contour points may be contour points of a target to be identified, such as the point $I_a$, points external to the contour of the target to be identified, such as the points $I_b$ and $I_c$ or else points of a contour internal to the target to be identified, such as the point $I_d$.

The method of measurement of proximity according to the invention comprises a step of one-to-one pairing of each of the points of the template contour to zero or a single point of the image contour and a step of allocating a local score of proximity to each point of the template contour, representing the proximity of this point of the template contour with the image contour.

More precisely, the step of pairing each of the points of the template contour comprises steps a)— and b)— below:

a)—a step of associating with each point of the image contour a point of the template contour, on the criterion of the smallest distance;

b)—for each point of the template contour, the determination of the set of image contour points with which it was associated in step a)—, and the determination of the closest image point in this set, on the criterion of the smallest distance.

This method requires that, in step a)—, two items of information are stored for each point of the image contour: the coordinates of the associated template contour point and the corresponding distance between the two associated points, so as to perform step b)— of pairing on the basis of these two items of information.

The distance considered is the Euclidean distance, a true measurement or a discrete measurement of which is performed according to the calculation procedures used. In particular, the use of a chamfer procedure, making it possible in a known manner to speed up the calculation time, uses a discrete measure of the Euclidean distance.

Figure 2:
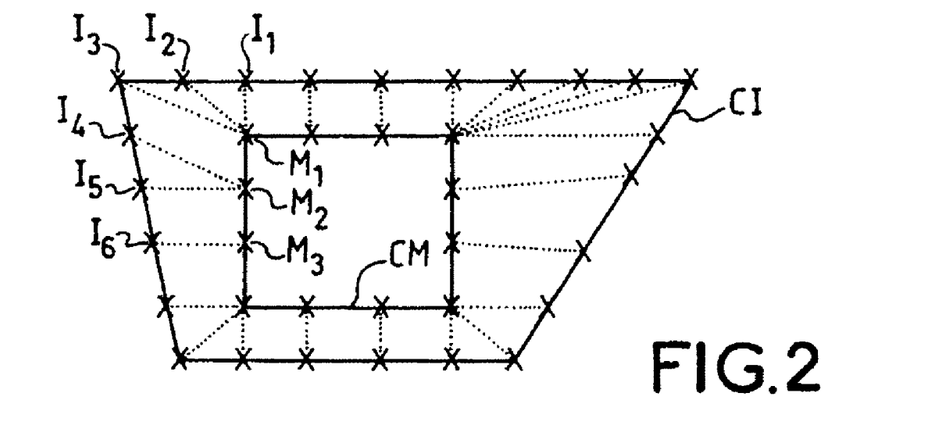
FIG. 2 illustrates the step of associating a point of the image with a point of a template contour according to a method of measurement of proximity of a template contour to the image contour to be analyzed according to the invention.
Figure 3:
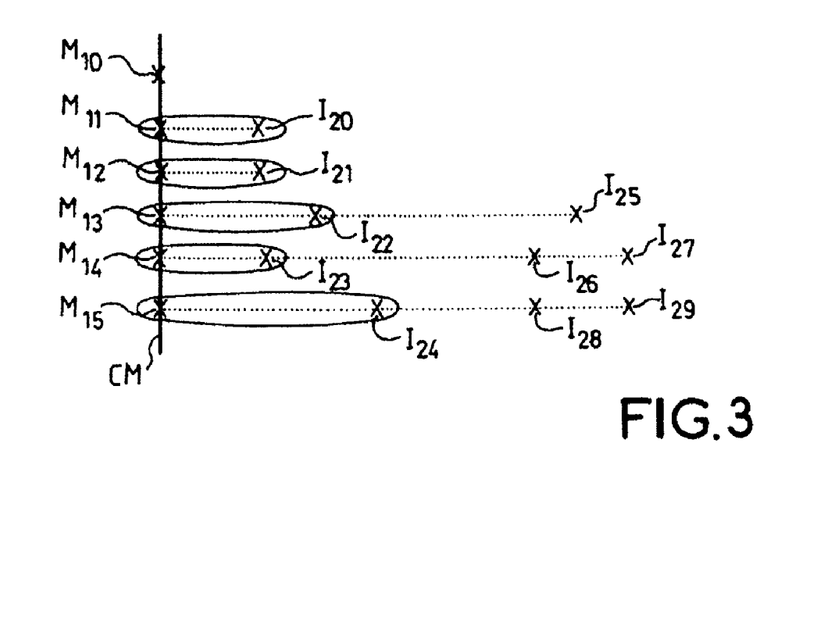
FIG. 3 illustrates the step of pointwise pairing according to a method of measurement of proximity of a template contour to the image contour to be analyzed according to the invention.

Steps a)— and b)— are illustrated in FIGS. 2 and 3.

Step a)— is illustrated in FIG. 2. We evaluate the proximity of the points of the image contour CI with the template contour CM, so as to associate with each point of the image contour a point of the template contour that is closest. Thus, as represented in FIG. 2, if we take a point of the image contour CI, the evaluation of the point of the template contour that is closest consists in searching for the smallest distance d between this point of the image contour and a point of the template contour. In the example represented in FIG. 2, this evaluation leads to the associating of the point $M_1$ of the template contour CM with the point $I_1$ of the image contour CI. In this example, we also have the following associations: $(I_1, M_1)$, $(I_2, M_1)$, $(I_3, M_1)$, $(I_4, M_2)$, $(I_5, M_2)$, $(I_6, M_3)$.

In the course of this step, one and the same point of the template contour may be associated with different points of the image contour. In the example, the point $M_1$ of the template contour CM has been associated with the points $I_1, I_2, I_3$ of the image contour.

Step b)— is illustrated in FIG. 3. It consists for each point of the template contour, in selecting from among the points of the image contour which were associated with it in the first step a), the point of the image contour that is closest to the point of the template contour. In FIG. 3, dotted lines represent the matching up of points of the image contour with points of the template contour according to the first step a). For each template contour point, we thus have 0, 1 or n points of the image contour that are associated according to this step a). For example, for the image contour point $M_{15}$, we have three associated points of the image contour: $I_{24}$, $I_{28}$, and $I_{29}$.

Step b)— consists in keeping only the closest image point, when it exists, from among the image contour points associated with one and the same template contour point and in evaluating the local score of proximity of this template contour point to the image contour on the basis of the pairing (template contour point-image contour point) thus performed.

In the example of FIG. 3, the pairing of point $M_i$ (template) to point $I_k$ (image) according to the invention is as follows: $(M_{10}$, zero image points); $(M_{11}, I_{20})$; $(M_{12}, I_{21})$; $(M_{13}, I_{22})$; $(M_{15}, I_{24})$.

With a pointwise pairing according to the invention, the contour points for image $I_{25}$ to $I_{29}$ will therefore not be taken into account in the evaluation of the proximity of the template.

The step of pointwise pairing according to the invention provides for each point $M_i$ of the template contour $M_i$ paired with a single point of the image contour $I_k$, a measure of proximity of this point $M_i$ to the image contour. This measure of proximity of the point $M_i$ may be written:

$\text{Dist}(M_i) = d(M_i, I_k)$, where $d(M_i, I_k)$ is a true or approximate measure of the Euclidean distance between the two paired points. It is expressed as a number of pixels.

The method furthermore comprises a step of allocating a local score of proximity to each of the points of the template contour as follows: the score takes a value lying between 0 and 1, all the greater the closer the paired points (the smaller the proximity measure for this point). More precisely:

if a point of the template contour is not reached by any point of the image contour, corresponding to a point of the template contour that is very far from the image contour, it is allocated the score zero. In the example of FIG. 3, the score allocated to the point $M_{10}$ is zero: $N(M_{10}) = 0$.

if a point of the template contour is reached by a single point of the image contour, it is assigned a score that is all the larger the closer the points. For example, we could have $N(M_{12}) = 0.7$; $N(M_{15}) = 0.3$.

The last step of the method then consists in determining the global score for the template, by averaging the local scores of all the points of the template contour.

According to this principle of evaluation, the template contour is evaluated as being all the closer to an image contour the higher the global score allocated to it.

Figure 4A:
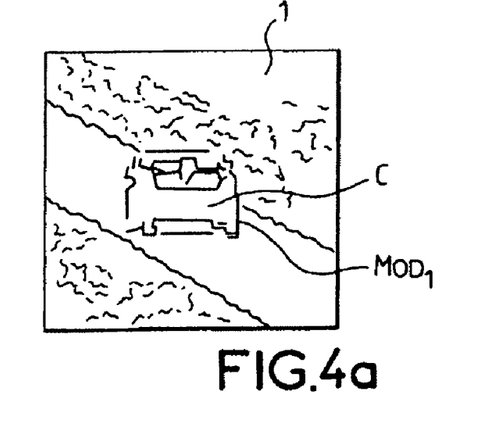
FIGS. 4a and 4b illustrate a problem of detection of false hypotheses.
Figure 4B:
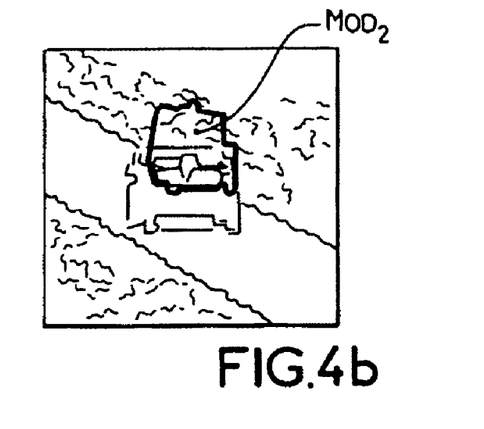

It has been possible to show that such a process of automatic identification of targets according to the invention makes it possible to avoid detection errors of the type illustrated in FIGS. 4a and 4b. In these figures, a first template $MOD_1$ (FIG. 4a) and a second template $MOD_2$ (FIG. 4b) have been superimposed on an image 1 comprising a target C. The first template $MOD_1$ corresponds in the example to the target to be detected on which it is perfectly positioned. It leads to an adopted hypothesis. The second template corresponds to another type of target. However, with a method according to the state of the art, the hypothesis will be adopted, on account of the presence of points of contours not belonging to the contour of the target, but belonging in reality to the background, or to points of internal contours.

According to an embodiment of the invention, the evaluation of the local score of proximity of each point of the template contour is a function of the distance d between this point and the point of the image contour paired according to the invention.

Figure 5A:
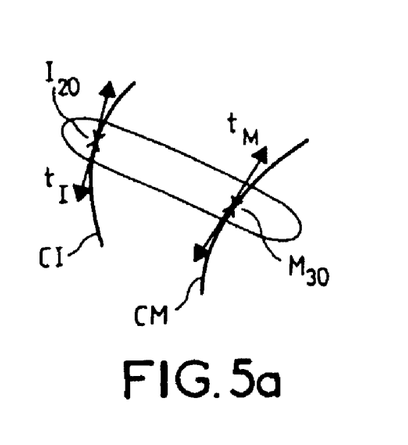
FIGS. 5a and 5b illustrate the orientation classes associated with the points of the image and template contours.
Figure 5B:
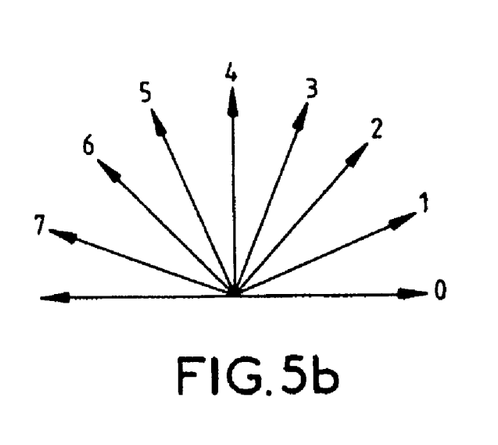

Preferably, and as represented diagrammatically in FIGS. 5a and 5b, the evaluation of the proximity of two points comprises the involvement of the class of orientation at the points $I_{20}$ and $M_{30}$ of the pair P considered. This class is typically defined by the orientation of the tangent of the contour at the point considered: represented in FIG. 5a is the tangent tl at the image contour point $I_{20}$ of the image contour CI and the tangent $t_M$ at the template contour point $M_{30}$ of the template contour CM. We define n orientation classes with n an integer: orientation class 0 corresponds to a horizontal orientation of the tangent; orientation class n−1 corresponds to a vertical orientation of the tangent and each of the intermediate orientation classes corresponds to an orientation of the tangent that is determined, lying between 0 and π rads. These classes are represented in FIG. 5b with n=8. In this example, the point $I_{20}$ belongs to orientation class 6 and the point $M_{30}$ belongs to orientation class 5.

In a general manner, if the tangents tl and $t_M$ coincide, that is to say if the two paired points belong to the same orientation class, then ΔORI=0. If the two paired points are in orthogonal classes ΔORI=n−1. More generally, we have ΔORI=|class (Ik)−class(Mi)| (in terms of number of pixels).

In the example represented in FIG. 5a, ΔORI=6−5=1

The corrected measure of proximity to the image contour of the template contour point $M_i$ paired with the image contour point $I_k$ may thus be written:

$$\text{Dist}(M_i) = d(M_i, I_k) + \frac{1}{4}\Delta ORI.$$

In practice, with n=8 classes, a good compromise is obtained in terms of false detections and calculation time.

In this improvement, the proximity measure is a continuous function of position and of orientation. Thus, the weight of the orientation, the latter possibly being estimated erroneously, is limited.

In a variant of involvement of the orientation class, the orientation class is taken into account in the step of association of the pointwise pairing process, by not allowing association (and hence pairing) other than between points of the same class. In this case, the proximity measure Dist($M_i$) is equal to the distance between the two paired points $M_i$ and $I_k$.

The allocation of the local score of proximity N($M_i$) of a point of the template contour $M_i$ as a function of the proximity measure according to the invention must contribute to the robustness of the identification method.

This local score conveys a probability of similarity between the template contour and the image contour: it takes a value on the interval [0, 1]. When it is equal to zero, it implies that the template contour point does not "match" with the image contour; when it is equal to 1, it implies a strong probability that the template contour corresponds to the image contour.

Thus, all the points of the template contour which could not be paired with a point of the image contour according to the method of the invention must have a zero contribution, that is to say a zero score, implying that they are very far away from the image contour.

For the points of the template contour that are paired with a single point of the image contour, the function for allocating the score preferably follows the following criteria:

the score must take a value equal to 1 when the proximity measure Dist($M_i$) is zero;

the score must take a value of about 1 when the proximity measure Dist($M_i$) lies between 0 and 1.

the score must decrease very rapidly to zero as soon as the proximity measure Dist($M_i$) becomes greater than 1.

the curve of allocation of the score N($M_i$) possesses a point of inflexion, preferably for a proximity measure Dist($M_i$) of around 2 pixels.

the score must take a quasi-zero value as soon as the proximity measure Dist($M_i$) becomes greater than 3 pixels.

Figure 6:
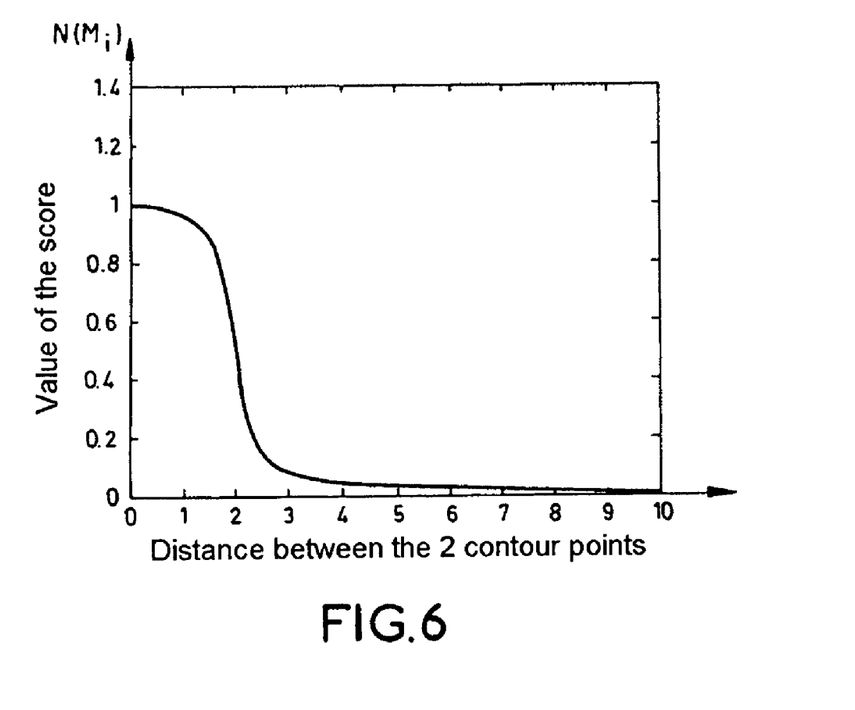
FIG. 6 represents the curve associated with an exemplary function for allocating a local score of proximity according to the invention.

The function N($M_i$) for allocating the score to a point of the template contour $M_i$ paired according to the invention to the point of the image contour $I_k$ will have for example the shape represented in FIG. 6, which corresponds to the following function:

$$N(M_i) = \left(0.5 - \arctan\frac{4(\text{Dist}(M_i) - 2)}{\pi}\right)\frac{1}{0.9604}.$$

A practical implementation of a method of proximity measurement according to the invention may use so-called chamfer calculation procedures. These chamfer procedures are very efficient in terms of calculation time and are much used in numerous fields of image processing including shape recognition.

A conventional chamfer procedure makes it possible for a contour to be matched up with a map having two inputs x and y corresponding to the coordinates of a given point, and having an output, which is the smallest distance from this point (x,y) to the contour. Stated otherwise, we evaluate the smallest distance from the point (x,y) to the contour mapped by means of level curves. This known chamfer procedure is generally used to apply the Hausdorff measure method. In this case, the chamfer procedure is applied to the image contour, making it possible to determine for each point (x,y) of the template contour, the smallest distance to the image contour.

In the method according to the invention, the chamfer procedure must be applied in a different way.

Initially, in the first step of association of the method according to the invention, we seek to measure the smallest distance from a point of the image contour to the template contour. This now involves applying the chamfer procedure to each of the template contours rather than to the image contour.

However, the calculation of the chamfer map of a template contour is independent of the image of extracted contours to be analyzed. These calculations may therefore be performed once and for all and stored, to be utilized in due course, in real time, for the analysis of a given contour image.

Next, to allow the pointwise pairing according to the invention, the chamfer map of the template contour must provide as output a first item of information which is the distance between the two associated points, and a second item of information which is the identification of the template contour point associated with this distance. This second item of information is necessary since this is what will make it possible in the pairing step to determine the set of image contour points associated with one and the same template contour point, and to automatically deduce therefrom the measure of proximity through the first associated item of information.

Thus, a fast calculation method according to the invention comprises the calculation of a chamfer map for each template contour, said map giving, as a function of the two inputs x and y corresponding to the coordinates of an image contour point, an item of information $S_0(x,y)$ identifying the template contour point reached by the smallest distance measure, and an item of information $S_1(x,y)$ corresponding to the value of this measure.

Next, we apply the steps of pointwise pairing and of allocation of a local score to each point of the template contour, dependent on the proximity measure $Dist(M_i)$ for the paired points.

This procedure does not make it possible to correct the measure of proximity $Dist(M_i)$ of a point of the template contour $M_i$ as a function of the class of orientation of this point and of the paired image contour point $I_k$.

Provision is then made to calculate a chamfer map per class of orientation of the template contour. We therefore have n chamfer maps per template contour. We have seen that, preferably, n=8.

The step of associating a point of the template contour with each point of the image contour then comprises, for each point of the image contour, the prior determination of the orientation class of this point, and the selection of the chamfer map of the template contour from the corresponding orientation class.

Finally, the calculation of the global score $\eta$ consists in averaging all the local scores, i.e., if the template contour comprises I template contour points $M_{i=1 \text{ to } I}$, $$\eta = \frac{1}{I}\sum_{i=1}^{I} N(M_i).$$

The method according to the invention is applied to all the template contours, scanning them over the whole image each time.

We obtain a global score for each template contour (template contour to be understood as template contour in a given position), which is a measure of probability of similitude of this template contour to the image contour.

For example, we obtain the global score $\eta_1$ for template contour $CM_1$; $\eta_2$ for template contour $CM_2$, etc.

Preferably, we then establish a selection of hypotheses. The word hypothesis is understood to mean a template contour (that is to say a target, from a certain viewpoint) in a determined position in the image.

The selection is typically obtained by adopting the most probable hypotheses corresponding to a global score obtained that is greater than a decision threshold. This threshold is preferably fixed at 0.6.

The implementation of such a process of automatic identification of targets using a method of proximity measurement according to the invention makes it possible to decrease the number of false alarms and to better discriminate between the various hypotheses. Stated otherwise, fewer hypotheses are adopted at output.

The table below shows by way of comparison, for different images containing a sole target to be identified, the number of hypotheses adopted on the criterion of the Hausdorff measure (hypothesis adopted if Hausdorff measure <2 pixels) and on the criterion of the global score of proximity ($\eta$>0.6) according to the invention. It is seen that the selection criterion based on the proximity score according to the invention gives better results in terms of rejection of false hypotheses.

On the other hand, it does not allow truly conclusive improvement in discrimination between two targets with close silhouettes. This is implied by the presence of superimposable hypotheses in the selection of hypotheses that is obtained. The concept of hypotheses which are superimposed is a concept well known to the person skilled in the art. It implies that the template contours of these hypotheses have contour points in common.

Another aspect of the invention makes it possible to improve this latter point.

The problem more particularly considered here is due to the fact that, at certain angles of view, for certain orientations, two targets may have relatively similar silhouettes that are close in the sense of the global score $\eta$ allocated according to the invention.

Nevertheless, in practice the presence of localized differences may be noted. When dealing with military vehicles for example, this is perhaps the presence of tracks or wheels; a substantially different length; a rounded shape or on the contrary an angular shape, etc.

Figure 7A:
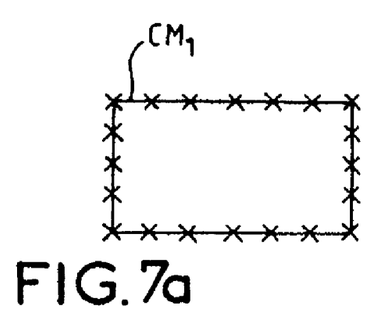
FIGS. 7a to 7d illustrate the principle of weighting of the local weighting score according to the invention.
Figure 7B:
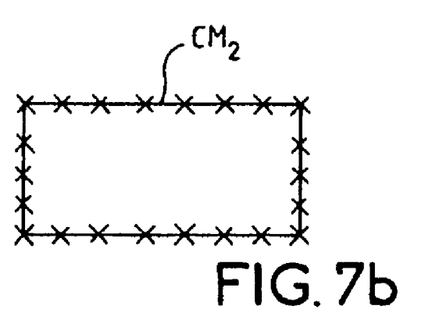
Figure 7C:
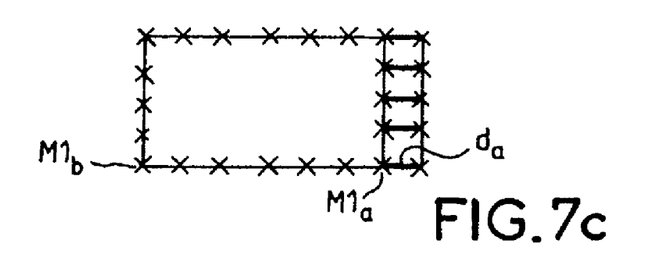
Figure 7D:
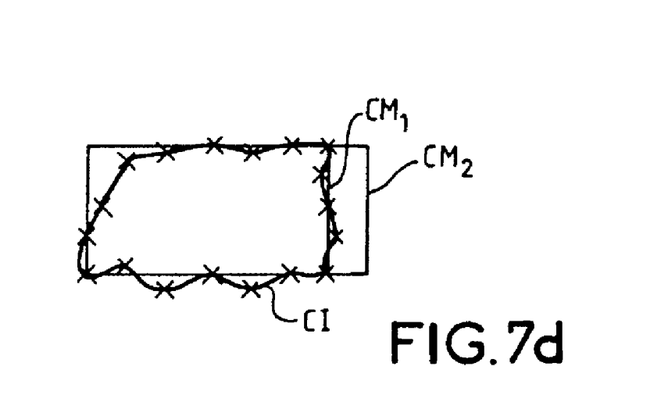

Certain parts of a template contour are therefore more informative than others relative to another template contour. FIG. 7d thus shows an image contour CI corresponding to an image of extracted contours. Two templates $CM_1$ and $CM_2$ represented respectively in FIG. 7a and FIG. 7b, are found to be close in the sense of the invention to this image contour.

The idea on which the refinement according to the invention is based consists in considering the two hypotheses which are superimposed, and in weighting the local score of each point of a template contour, this score having been established in the measure of proximity of this template contour to the image contour, by an amount of information representing the local difference at this point, with the other template contour.

According to the invention, the associated global score $\eta_1$ of the template contour $CM_1$ which measures the probability of similitude of this template contour $CM_1$ to the image contour CI is obtained by weighting each of the local scores. More precisely, the local score of proximity $N(M1_i)$ of each point $M1_i$ of the template contour $CM_1$ is weighted by a factor representative at this point of the amount of discriminating information which it contains with respect to the other template contour $CM_2$. This amount of information contained at a point $M1_i$ of the template contour $CM_1$ should be all the higher the further away this point is from the other template contour $CM_2$: this is the very definition of the measure of proximity at this point $Dist(M1_i)$ according to the method of the invention.

The amount of information of each of the points $M1_i$ of the first contour $CM_1$ relative to the contour $CM_2$ is therefore defined as follows:

$$X(M1_i)=Dist(M1_i)=d(M1_i,M2_j).$$

where $M2_j$ is a point of the template contour $CM2_j$ paired with the point $M1_i$ according to the method of proximity measurement of the invention. At a given point of the contour template $CM_1$, the larger the distance from the paired point, the bigger the amount of information at this point. This is represented diagrammatically in FIG. 7c. At the point $M1_a$, the amount of information $X(M1_a)$ is large, corresponding to the distance $d_a$ in the figure.

|  | Image 1 | Image 2 | Image 3 | Image 4 | Image 5 | Image 6 | Image 7 | Image 8 |
|---|---|---|---|---|---|---|---|---|
| Hausdorff | 4 | 5 | 3 | 2 | 3 | 7 | 2 | 8 |
| Global score $\eta$ | 3 | 2 | 0 | 2 | 3 | 2 | 0 | 4 |

At the point $M1_b$, the amount of information $X(M1_b)$ is zero, since at this point the two contours merge.

The procedures for chamfer calculation and for involving the orientation of the points in the distance measure that were described previously apply in the same way to this calculation of amount of information.

The method of weighting according to the invention then consists, in the step of calculating the global score $\eta_1$ of the contour $CM_1$ to the image contour, in weighting the local score of proximity of each point $M1_i$ of the template contour $CM_1$ by the associated amount of information $X(M1_i)$, i.e.:

$$\eta_1 = \frac{1}{m}\sum_{i=1}^{m} N(M1_i) \cdot X(M1_i).$$

We apply the method of weighting to the points of the second contour $CM_2$, inverting the role of the first and second contours, that is to say using the method of measurement of proximity of the second contour $CM_2$ to the first contour $CM_1$: we obtain the amount of information $X(M2_j)$ of each point $M2_j$ of the second contour $CM_2$ relative to the first contour $CM_1$. We weight the local score of proximity $N(M2_j)$ of each point $M2_j$ by the associated amount of information $X(M2_j)$. The global score $\eta_2$ is obtained by averaging the weighted local score of proximity of each of the points of the template contour $CM_2$, i.e.

$$\eta_2 = \frac{1}{l}\sum_{j=1}^{l} N(M2_j) \cdot X(M2_j).$$

Thus, more weight is given to the parts of the template contour which have the most information with respect to the others.

Stated otherwise, this amounts to discriminating between the two hypotheses on the basis of the contour points which contain the most information with respect to the other.

This concept of amount of information is therefore defined with respect to a given pair of template contours.

When more than two hypotheses are superimposed, we apply the method of discrimination pairwise.

Thus the invention describes a method of measurement of proximity of a second contour to a first contour, according to which each point $M_i$ of the second contour is paired with one or zero points of the first contour, giving a measure of proximity $Dist(M_i)$ at this point.

A method of automatic identification of targets according to the invention applies this proximity measurement process to determine the measurement of proximity of each point of a template contour, applied as second contour, to an image contour, applied as first contour. From this it deduces for each point of the template contour, a local score of proximity and for the template contour, a global score, giving a measure of probability of similitude to the image contour.

The method of automatic identification thus determines the global score associated with each of the template contours of a collection (with as many different template contours as different 3D templates and as viewpoints considered for each 3D template).

According to another aspect of the invention, it applies a criterion for selecting hypotheses, adopting as probable hypothesis, each of the template contours whose global score is greater than the threshold.

According to a variant, the template contours of the collection correspond to a selection of hypotheses, that arises from another process, for example, that arises from a Hausdorff measure.

According to another aspect of the invention, the method of automatic identification then applies the method of weighting to each pair of hypotheses which are superimposed from among the hypotheses adopted, to obtain for the template contour associated with each hypothesis, a global score weighted according to the invention. To do this, it uses the method of proximity measurement, applying it a first time to measure the amount of information associated with each point of the contour of the first hypothesis, applied as second contour, relative to the contour of the second hypothesis, applied as first contour, and to calculate the associated global score by averaging the weighted local scores. It applies the method of proximity measurement a second time to measure the amount of information associated with each point of the contour of the second hypothesis, applied as second contour, relative to the contour of the first hypothesis, applied as first contour, and to calculate the associated global score by averaging the weighted local scores. Then, the identification system selects the best hypothesis. If the hypotheses which are superimposed are greater than two in number, the automatic identification system applies this weighting pairwise, so as to adopt the best hypothesis each time.

The performance of a system for the automatic identification of targets using such a method of identification according to the invention has been tested on a workstation, on a base containing 200 images to be analyzed and 9 3D targets corresponding to terrestrial vehicles. A significant improvement in the identification performance was thus demonstrable, with a rate of appropriate identification of 80%, as against 50% obtained with methods of the prior art.

It will be noted that the application of an automatic identification system according to the invention to a first selection of hypotheses that is obtained from another automatic identification process, such as a process using the Hausdorff measure, does not change the identification performance, but advantageously makes it possible to save calculation time.

The invention just described makes it possible to appreciably improve the robustness and the discrimination of an automatic identification system which implements it. It applies to the military field, but more generally, to any field using shape recognition by comparison with a series of templates.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by the definition contained in the appended claims and equivalent thereof.

The invention claimed is:

1. An automated method of evaluating proximity of a second contour correspondent to a template contour provided by a database containing templates of determined objects to be recognized, to a first contour extracted from an image, comprising:

determining points of the second contour that are each univocally paired with one point of the first contour according to a pointwise pairing step comprising:

a step of associating each point of the first contour with a point of the second contour determined as the closest, resulting for each point of the second contour, in a set of points of 0, 1 or n points of the first contour, that is associated with, then a step of univocally pairing each point of the second contour with one point of the first contour if said one point of the first contour exists, by determining from among said set of points of the first contour, the point of the first contour which is the closest to said point of the second contour, and evaluating the proximity of said second contour to said first contour as a function of a proximity measure of each of said determined points of the second contour, with the one point of said first contour to which it is univocally paired, wherein the associating step uses a chamfer map of the second contour via which, at each point of the first contour with coordinates x and y applied as input, said map provides as output an identification of the associated point of the second contour and a measure of the proximity between the two points thus associated.

2. The method as claimed in claim 1, wherein with the second contour is associated a chamfer map per class of orientation, and for each point of the first contour, the associating step comprises a step of determining the class of the point of the first contour, so as to apply the coordinates (x,y) of this point as inputs to the chamfer map corresponding to said orientation class.

3. The method as claimed in claim 1, comprising eight orientation classes wherein the associating step uses a chamfer map of the second contour via which, at each point of the first contour with coordinates x and y applied as input, said map provides as output an identification of the point of the associated second contour and a measure of the proximity between the two points thus associated; and the second contour is associated a chamfer map per class of orientation, and for each point of the first contour, the associating step comprises a step of determining the class of the point of the first contour, so as to apply the coordinates (x,y) of this point as inputs to the chamfer map corresponding to said orientation class.

4. An automated method of identification of targets in an image, comprising applying an automated method of evaluating-of proximity of a second contour to a first contour, wherein the method of evaluating comprising:

determining points of the second contour that are each univocally paired with one point of the first contour according to a pointwise pairing step comprising:

a step of associating each point of the first contour with a point of the second contour determined as the closest, resulting for each point of the second contour, in a set of points of 0, 1 or n points of the first contour, that is associated with, then a step of univocally pairing each point of the second contour with one point of the first contour if said one point of the first contour exists, by determining from among said set of points of the first contour, the point of the first contour which is the closest to said point of the second contour, and evaluating the proximity of said second contour to said first contour as a function of a proximity measure of each of said determined points of the second contour, with the one point of said first contour to which it is univocally paired, the identification method further comprising an allocation of a local score of proximity $N(M_i)$ to each point $M_i$ of the second contour as a function of a measure of proximity of this point $M_i$ to the first contour, which has a value lying between 0 and 1, which is equal to zero if it is paired to zero points of the first contour, and if it is paired to one point of the image contour, which is equal to a value that is small when the distance between the two paired points is large, and which is equal to a value that is large, when the distance between the two paired points is small.

5. The method of identification of claim 4, wherein the allocation of a local score of proximity $N(M_i)$ to each point $M_i$ of the second contour as a function of a measure of proximity $Dist(M_i)$ of this point $M_i$ to the first contour, is made according to the following criteria:

$N(M_i)$ has a value lying between 0 and 1;
$N(M_i)=0$, when said point is paired with zero points of the first contour;
$N(M_i)=1$, when the proximity measure is equal to zero;
$N(M_i)$ has a value of about 1 when the proximity measure lies between 0 and 1 pixels;
$N(M_i)$ decreases very rapidly to 0 as soon as the proximity measure becomes greater than 1 pixel;
$N(M_i)$ decreases according to a curve having a point of inflexion, in the neighborhood of a proximity measure of about 2 pixels;
$N(M_i)$ has a quasi-zero value as soon as the proximity measure becomes greater than 3 pixels.

6. The method of identification as claimed in claim 4, wherein the function for allocating the score of proximity to the point $M_i$ may be written:

$$N(M_i) = \left(0.5 - \arctan\frac{4(Dist(M_i)-2)}{\pi}\right)\frac{1}{0.9604}.$$

7. The method of identification as claimed in claim 4, comprising a step of measuring a global score $\eta$ equal to the mean of the proximity scores relative to the number of points of the template contours.

8. The method of identification as claimed in claim 4, applied successively to each of the template contours of a collection of template contours.

9. The method of identification as claimed in claim 8, wherein said collection is obtained from another method of identification of targets, such a method using a Hausdorff distance measure.

10. The method of identification as claimed in claim 4, comprising a step of selecting hypotheses by comparison with a threshold of each of the global scores $\eta$ allocated to each of the template contours of a collection of template contours of a collection.

11. The method of identification as claimed in claim 10, wherein said threshold is fixed at 0.6.

12. The method of identification as claimed in claim 10, comprising a step of discriminating between hypotheses of template contours which are superimposed, comprising for each pair of a first contour hypothesis and of a second contour hypothesis which are superimposed, a step of weighting the global score allocated to each of the template contours, said weighting step comprising the application of the method of measurement of proximity wherein:

by applying as second contour, the contour of said first hypothesis and as first contour, the contour of said second hypothesis, said proximity measure obtained for each point of contour of the first hypothesis being applied as weighting factor for the local score of proximity of this point to the image contour, and by deducing the global score associated with the first contour hypothesis representing its proximity to the image contour by calculating the mean of said weighted local scores, by applying as second contour, the contour of said second hypothesis and as first contour, the contour of said first hypothesis, said proximity measure obtained for each point of contour of the first hypothesis being applied as weighting factor for the local score of proximity of this point to the image contour and by deducing the global score associated with the first contour hypothesis representing its proximity to the image contour by calculating the mean of said weighted local scores; and a step of allocating a measure of proximity $Dist(M_i)$ of each point $M_i$ of the second contour to the first contour, based on the measurement of the distance from this point to the point of the first contour with which it is paired.

13. The method of identification as claimed in claim 12, wherein an hypothesis is adopted as best hypothesis of template contour, from among a plurality of hypotheses which are superimposed, that with which the best global score is associated.

* * * * *